9667X

N. Scholfield,

Governor.

Patented May 17, 1836.

N. PETERS, PHOTO-LITHOGRAPHER, WASHINGTON, D. C.

{Extended for Seven years from 17th May 1850} May 17 1836 945

Nathan Scholfield 9667X

The Schedule referred to in these Letters Patent and making part
of the same containing a description in the words of the said Nathan
Scholfield himself, of his Improvement in the art of regulating the motion
of water wheels, Steam engines &c.

To all to whom these presents shall come.

Figure 1:
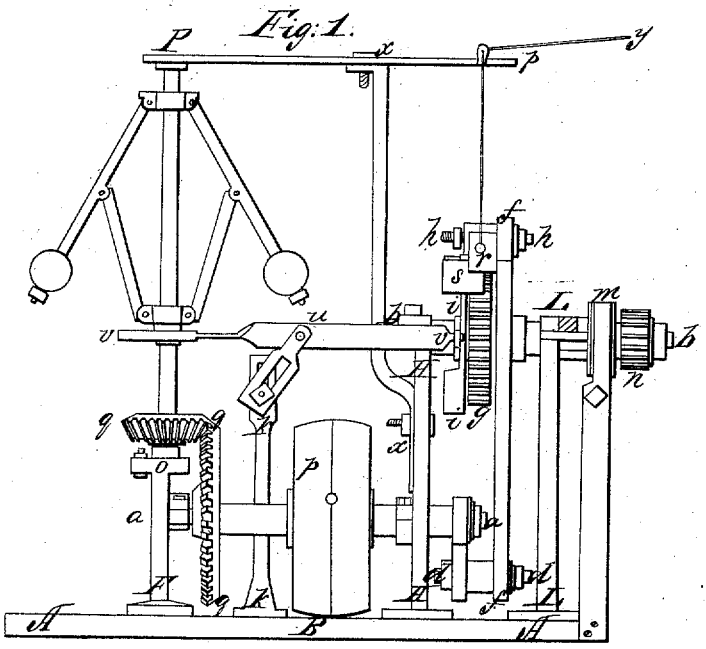
Figure 2:
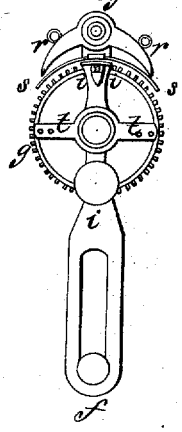

Be it Known that I Nathan Scholfield of Norwich
in New London County and State of Connecticut have invented a
new and useful improvement in the Governor or Regulator for water
wheels, Steam Engines &c. and that the following is a full and exact
description of the construction and operation of the said machine as
invented or improved by me. My improvement consists in making
such mechanical additions, to the common Steam Engine governor
as to cause it to move the gate or valve alternately and in degrees
corresponding to the variation of the motion from the true or required
velocity, also to cause it when it does move the gate to do so suddenly
and then to rest some length of time for the visible effect of such
movement before moving it again &c.. A.B. Fig. 1st represents a
plank which serves as a base or support for the machine and in the
one which I shall describe is 28 inches in length 12 inches wide
and 1½ thick. F.O. – H.H. and L.L are studs or stands bolted to the
plank and serving as supports for the governor O P. and the horizon-
tal shafts a a and b b, the shaft a a being 6 inches and b b 11 inches
above the plank A B. p is a pulley on the shaft a a by which the
machine is put in motion ff is a pendulum lever fitting loosely on
the shaft b b as its fulcrum and point of suspension, and it has a
reciprocating motion by means of the crank a. d.d., the stud d.d. of
the crank moving up and down in the slot in the pendulum. (See
Fig. 2nd.) as the shaft a a revolves. h h is a stud made fast to the
top of the lever and on which are two hands or dogs r.r. which by
their reciprocating motion are allowed to move the toothed wheel
g alternately, one way or the other as occasion may require; and
the toothed wheel g being made fast to the shaft, moves it also, such motion being also communicated to the gate by means of gearing from the cogwheel n. - Now in order that the movements communicated to the gate or valve shall be proportional to the variation of the speed of the wheel or engine, and to prevent any movement when the motion is right, there is a guard S.S placed immediately under the hands r.r covering the top of the toothed wheel q said guard being supported by the arms i.i to which t.t are attached, the whole moving freely on the shaft b.b as its centre of motion, and being made to cover different parts of the toothed wheel depending on the velocity of the wheel or engine as indicated by the governor. This guard is governed by means of the lever v.v. extending from the slide v on the governor to one of the arms T connected with the guard the fulcrum of the lever being at w. and supported by the stand k.k. Thus when the motion is right the guard S.S stands directly over the top of the wheel and suffers the hands r.r. by their reciprocating motion just to come to the edge without moving the wheel q but if the motion is rather too slow which is indicated by a gradual contraction of the governor and a falling of the slide v, the guard S.S will be moved so that one of the hands will move the wheel q, perhaps one tooth at a time but if the motion is still slower the guard will pass farther from the centre and the wheel q will be moved 2.3.4.6 or 8 teeth at a time depending on the variation from the required velocity, and if the motion is too fast which is indicated by the expansion of the governor, raising the slide v and moving the guard S.S. on the other side of the centre, the other hand is suffered to take hold of the toothed wheel and close the gate, in the ratio of such variation. The governor O.P. is similar in construction to a steam engine governor it is put in motion by the bevel gearing q q q, x.x is a piece of iron bolted on to the stand H.H, and serves as a support for the iron brace P.P which supports the top of the governor W.M is a friction strap of iron passing over a friction pulley of iron turned on the shaft b.b, the friction strap is fastened to each side of the plank and made to hug with some degree of force on the pulley by means of a bolt at e the object of this fric-
tion is to hold the gate wherever the regulator places it and to
prevent its moving of itself — y is a line passing through a hole in the
plate P.P and fastened to the hands r r by which they may be raised
and in effect the machine thrown out of gear and the gate may be
shut or hoisted at pleasure — When the water is low as is frequently
the case not being sufficient to drive the wheel with the required
velocity the regulator would have a tendency to continue its action
after the gate should be clear open to prevent which, I usually have
some communication by a line or lever between the hand that hoists
the gate, and the stem or handle of the gate by which this hand is
raised when the gate comes to a certain point which prevents it from
moving any farther, but as soon as the motion is too fast the other
hand being at liberty closes the gate a little and soon relieves the one
that was raised allowing it to act as usual, so that the machine
may be run with perfect safety even when the water is low —
I have sometimes used the same principle under various modifica-
tions one of which is this — I placed two ratchets wheels in the room
of the toothed wheel g at some distance as 12 or 18 inches asunder on
the same shaft and two levers with reciprocating motions, one hand
or dog in each to work in their respective ratchets and to govern
which I used a ballance or lever with a curved guard at each
end extending very near to the ratchet wheels but not so as to touch
them, these guards were so curved as to form an angle with the
periphery of the wheels, and the hands being made a little wider than
the wheels would not rest on the guards moving freely when the motion
was right, but if the motion varied, the governor operating on the
ballance, caused one end with the guard to descend allowing the
hand to move the gate in a degree corresponding to such variation.

What I claim as my invention and wish to secure by Letters Patent
is the causing a revolving centrifugal governor to act upon a guard
or check through the intermedium of a lever or otherwise, substantially
in the manner herein described, by which means a water gate or steam valve will be opened or closed but not by a slow and continuous motion as is the case with the centrifugal governor, as ordinarily applied, but by a sudden action to a certain extent but still in a ratio approaching that of the variation of the increasing or decreasing velocity (as indicated by the governor,) from the required velocity such movement being repeated at short intervals until the required velocity is obtained, and I do hereby declare that having fully and clearly pointed out as I believe the nature of my said invention, and what I now deem the best practical manner of carrying the same into operation, I do not intend by any thing herein contained to limit or confine myself to that arrangement of the respective parts but to vary the same in matters of detail as I may think proper, whilst the intended result is attained by analogous means.

Witnesses Nathan Scholfield

W Thompson

John Waters

Drawing

[illegible]

[1400 wds]

May 17 1836